June 3, 1930.  J. P. REDMOND ET AL  1,761,050
ELECTRIC COACH FARE RECORDER
Filed July 23, 1927   6 Sheets-Sheet 1

INVENTORS
Joseph P. Redmond and
Frank F. Haack,
BY Morsell, Keeney & Morsell
ATTORNEYS June 3, 1930.   J. P. REDMOND ET AL   1,761,050
ELECTRIC COACH FARE RECORDER
Filed July 23, 1927   6 Sheets-Sheet 5

Patented June 3, 1930

1,761,050

UNITED STATES PATENT OFFICE

JOSEPH P. REDMOND AND FRANK F. HAACK, OF MILWAUKEE, WISCONSIN

ELECTRIC COACH-FARE RECORDER

Application filed July 23, 1927. Serial No. 207,940.

This invention relates to improvements in electric coach fare recorders.

Since the advent of common carriers a conductor has been assigned the task of collecting fares and the honesty of the conductor is entirely depended on for the properly turning in of all revenue derived from cash fares or collected tickets, from the passenger trips of the carrier. In view of the fact that there is no provision on cars or coaches to reliably record the transactions as they occur from the initial start of the train to the finish of the trip, from time to time, collectors, checkers or detectives have been assigned to trains to ascertain the conductor's honesty.

It is, therefore, the primary object of the present invention to overcome the above objections by providing a fare recorder for coaches which will record the mileage, fares collected, and passengers on and off at every station in accordance with the fare paid.

A further object of the invention is to provide a recorder of the class described in which the transactions in connection with a coach are recorded on a roll of paper which is available for future reference and auditing.

A further object of the invention is to provide a recorder of the class described adapted to be mounted at the end of a coach in plain view of all of the passengers and to clearly show the fares recorded by the conductor as collected, passengers registered on the coach in accordance with the fare paid, and passengers registered off the coach at the termination of their trip.

A further object of the invention is to provide a recorder of the class described electrically controlled by a plurality of key boards situated along the walls of the coach readily accessible to the conductor.

A further object of the invention is to provide an electric coach fare recorder which is of simple construction, is strong and durable, is easy and efficient in operation, and is well adapted for the purposes described.

With the above and other objects in view the invention consists of the improved electric coach fare recorder, and its parts and combinations as set forth in the claims, and all equivalents thereof.

In the accompanying drawings in which the same reference characters indicate the same parts in all of the views:

Fig. 17 is a fragmentary view of the recorder roll showing a record as made by the recorder.

Referring now more particularly to the drawings it will appear that the apparatus includes a recording device contained in a casing or housing 20, adapted for mounting at the end of a coach, and a key board 21, positioned in an accessible place in the coach, in electrical connection with the recording device and adapted to be operated by members of the coach crew. In practice it is contemplated that each coach will be equipped with a plurality of key boards arranged in staggered formation along opposite walls of the coach and between the windows. The recorder is provided with means for recording on a paper roll for a permanent record the miles run by the coach on the trip, the fare collected from each passenger (the collected fare also being shown through windows in the casing 20 for the benefit of passengers), the number of passengers who got on the coach at each station, and the number of passengers getting off the coach at each station. The mechanism for indicating each of the items mentioned will be explained individually.

Mounted within the forward lower portion of the casing are a pair of spaced paper roll supporting brackets 22 extending vertically and provided with notches 23 which removably receive pins 24 projecting from a pair of ribbon roll supporting brackets 25. An unwinding paper drum 26 having a paper roll 27 thereon is removably journaled in notches 28 in the upper portions of the brackets 22, while a winding paper drum 29 is removably journaled in the lower portions of the brackets 22 by means of keyed studs 40 which may be pulled outwardly. An upper ribbon roll 30 is journaled in the upper portions of the brackets 25 while a lower ribbon roll 31 is removably journaled in the lower portions thereof by means of outwardly movable studs 41, and an inked ribbon 32 is adapted to be rolled from one to the other in juxtaposition to an exposed portion of the paper.

Mounted on one of the studs 40 of the lower paper drum 29 is a ratchet 33 adapted to have a stepped movement in one direction, and being so moved by a dog 34 mounted on the free end of a link 35 which is pivotally mounted at its other end on said drum shaft, said link also having pivotally connected thereto a lever 36. The lever 36 also has pivotally connected thereto, intermediate its ends, a link 37 loosely mounted on a lower ribbon roll stud 41 and carrying at its upper end a pivotal dog 38 to actuate in one direction a ratchet 39 on said ribbon roll shaft, whereby said roll is turned. The lever 36 is reciprocated by a vertical lever 42 pivotally connected at its lower end to the casing 20, as at 43, and the reciprocation of the levers is accomplished by a cam 44 mounted on a shaft 45 extending through the lever 42, the cam being arranged to move against the surface of a fixed bracket 46.

Figure 15:
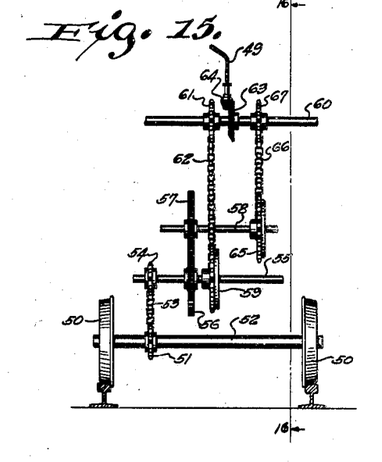
Fig. 15 is an end view showing the geared connections between the wheels of a coach and the recorder.
Figure 16:
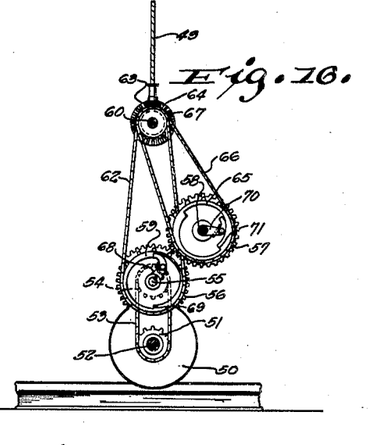
Fig. 16 is a side view thereof.

The lever 42 is formed with an intermediate off-set bifurcated portion 47 in which is journaled a worm 48 which is driven by a flexible shaft 49 connected thereto and said flexible shaft extends through an opening in one side of the casing and connects with a mechanism shown in Figs. 15 and 16 operated by revolutions of the wheels 50 of a coach. Said mechanism for turning the flexible shaft includes a sprocket wheel 51 mounted fast on the coach axle 52 and connected by a chain 53 with a sprocket wheel 54 mounted fast on a shaft 55. There is also mounted on the shaft 55 a gear 56 which drives a gear 57 fast on another shaft 58. Also on the shaft 55 is a loose sprocket wheel 59 which is connected with an upper shaft 60 through a sprocket wheel 61 thereon and a chain 62 between the sprocket wheels 59 and 61. The upper shaft 60 carries a bevel gear 63 which turns a pinion 64 carried at the outer end of the flexible shaft 49. There is also mounted loosely on the shaft 58 a sprocket wheel 65 which is connected by means of a chain 66 with a second sprocket wheel 67 on the upper shaft 60. It is to be noted that the shaft 55 is provided with a keyed driving dog 68 and when the driving dog 68 rotates in a counter clock-wise direction in Fig. 16 it will engage a shoulder 69 on the face of the sprocket wheel 59 to drive it and thereby driving the flexible shaft in through the sprocket wheel 61 and shaft 60. However, if the car axle 52 turns in a reverse direction the shaft 55 and driving dog 68 will likewise turn in a reverse direction, with the result that the loose sprocket wheel 59 will not be turned. In this event the flexible shaft 49 is rotated in the same direction as formerly through the sprocket wheel 67 and the loose sprocket wheel 65 on the shaft 58, said shaft carrying a driving dog 70 for driving engagement with the shouldered face 71 of the sprocket wheel 65 in one direction of rotation of the driving dog. This mechanism permits the flexible shaft 49 to always turn in the same direction, regardless of the direction of rotation of the coach axle, as in a change in the direction of movement of the coach.

As mentioned, the worm 48 is turned by the flexible shaft 49 and the worm operates a worm wheel 72 meshing therewith and mounted fast on the shaft 45. The worm and worm wheel are of such a ratio that the worm wheel will be turned one revolution for each mile of travel of the coach. Mounted loosely on the shaft 45 are four type wheels 73, 74, 75 and 76, each of which has on its periphery spaced apart type numbers 77 ranging from "0" to "9". Also, each of said wheels is of the "Geneva" type and is provided with slots 78. Mounted fast on the inner end portion of the shaft 45 is an arm 80 carrying at its outer end a pin 79 which engages in the slots of the inner wheel 73 and hence, for every revolution of the worm wheel there will be one-tenth of a revolution of the type wheel 73, advancing one number. The type wheel 73 carries a small gear 81 which drives a large gear 82, the ratio being one to ten; so upon every ten revolutions of the type wheel 73 the large gear 82 will move one-tenth of a revolution to advance the adjacent type wheel 74 one-tenth of a revolution, bringing into printing position another number, the type wheel 74 being moved by the engagement of a pin 83 with one of its notches 78. There is a similar arrangement between the type wheels 74, 75 and 76 so that the mileage will be totaled, as in ordinary speedometer mechanism and the like. The normal positions of all of the type wheels is with the zeros in printing position and said wheels are advanced from said positions against the tension of spiral springs 84. As the type wheels advance they are held against return movement by pawls 85 engaging ratchet wheels 86 integral with the type wheels. To reset the wheels to "zero" positions a lever 87 may be pressed which raises the pawls from their respective ratchet wheels, allowing the wheel springs 84 to return the wheels to normal positions. As previously mentioned, the cam 44 revolves with the worm wheel 72 and against the bracket 46. Said cam is so arranged that upon each movement of any of the type wheels to a new position, the lever 42 and all parts carried thereby, including the type wheels, will be swung forwardly to contact with the ribbon 32, causing numbers to be printed on the paper 27. On the return movement of the arm 42, assisted by a spring 88, the pawls 34 and 38, moving on the ratchets 33 and 39, will advance the paper roll and ribbon one line.

The mechanism also provides for the recording of fares paid by a passenger, the recorded fares being printed on the roll and also being displayed by numbers appearing through windows in the recorder. This recording is controlled by operations of keys on the key board 21 located on the wall of the coach. The first step in the recording of a fare is the turning of a lock 89 in the lower portion of the key board by means of a proper key. This movement operates an arm 90 which is pivotally connected, as at 91, with a plate 92. The plate is pulled downwardly thereby. It is to be noted that said plate is provided with series of notches 93 and when said plate is lowered said notches disengage complementary notches 94 in the shanks 95 of the denominational keys 96. The result is that said keys are then free to be pushed inwardly. The proper keys, representative of the fare collected, are next pushed inwardly. It is to be noted that the shanks 95 of the keys 96 extend at their inner end portions through openings 97 in vertical plates 98, there being one plate for each vertical row of keys and upon a depression of the keys the plates 98 of the depressed keys are raised by the shouldered portions 99 of said keys, said shouldered portions passing through the openings 97. A spring urged lever 100, mounted on a transverse shaft 101 on which the lower forked end portions of the plates 98 are also mounted, will then lower the raised plates and cause the depressed keys to be locked by the engagement of the shouldered portions 99 with the inner faces of the plates 98, as shown at A in Fig. 7. Also, as the keys are depressed, inclined surfaces 102 on the shanks 95 thereof will ride against the inclined surfaces 103 of apertured plates 104, raising said plates and causing spring urged fingers 105 to lodge within notches 106 in the shanks of the nondepressed keys, thereby preventing their depression.

Figures 7, 8, 9:
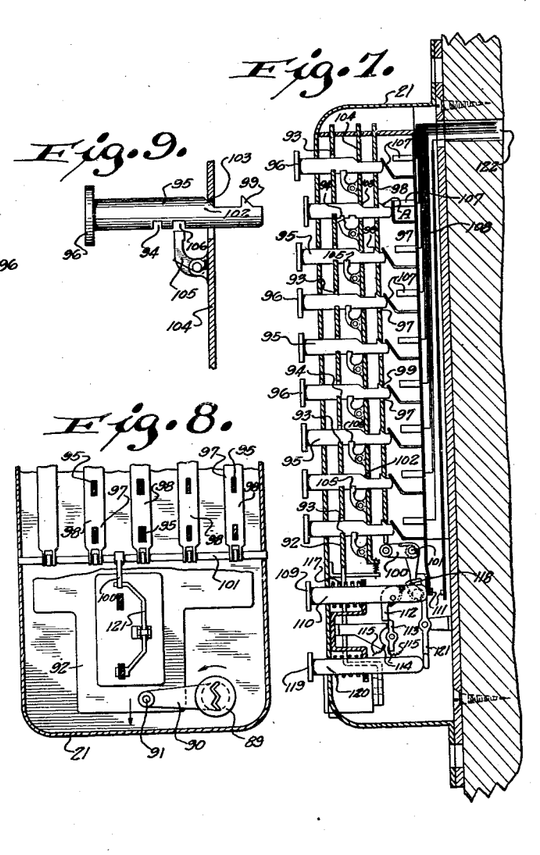
Fig. 7 is a vertical sectional view thereof.
Fig. 8 is a fragmentary sectional view of the lower portion of the key board.
Fig. 9 is an enlarged detail view, partly in section, of the construction and mounting of a key.

With the depression of the proper keys, the inner ends thereof close switches 107, as shown at A in Fig. 7, closing electrical circuits through proper wires of the group 108 to magnetic clutches in the recorder, as will be explained more in detail. When the proper circuits are thus closed a register key 109 is then depressed and its shank 110 operates to close a main switch 111 which will put the fare recording mechanism into operation. The depression of the register key also causes a pivotal spring urged finger 112 carried thereby to operate a switch control arm 113 closing a switch 114 and a circuit through wires 115 to number wheels in the recorder (to be later explained). Said last mentioned switch is closed momentarily just prior to the closing of the switch 111 and after the circuit is broken the number wheels controlled thereby are ready for recording the next fare.

There is also electrically connected with the switch 114 an incandescent bulb 116 at the front of the key board and when the circuit is closed it will glow momentarily to inform the conductor that the fare has been recorded. After said light is extinguished the register key 109 is released and is returned to normal position by a coiled spring 117. On the return movement, a pawl 118 (which has become lodged under the lever 100) moves lever 100 to the left in Fig. 7 and the plates 98 are raised thereby, releasing the shanks 95 of the depressed keys 96.

Should the conductor make a mistake in the depression of any of the keys 96, it may be remedied before the register key 109 has been depressed by depressing a correction key 119. Its shank 120 will then operate a lever 121 which will move the lever 100 to a position wherein the plates 98 are raised and releasing the depressed keys.

Figure 5:
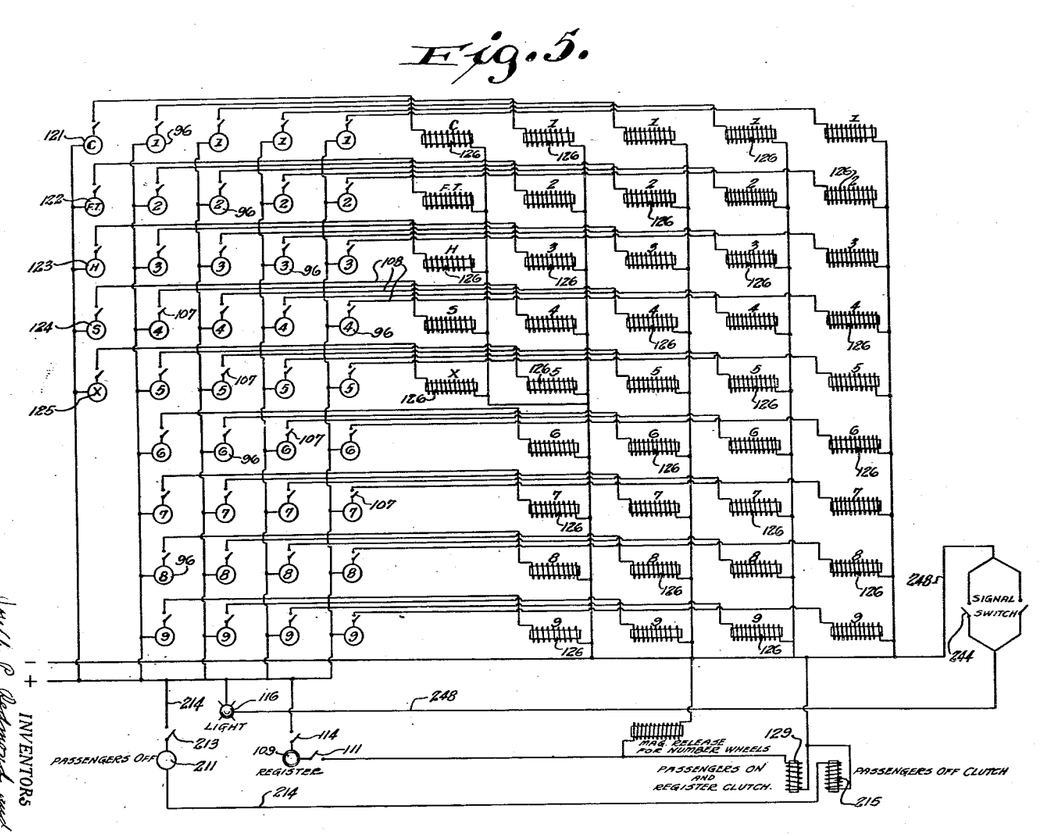
Fig. 5 is a diagram of the wiring arrangement for the entire device.
Figure 6:
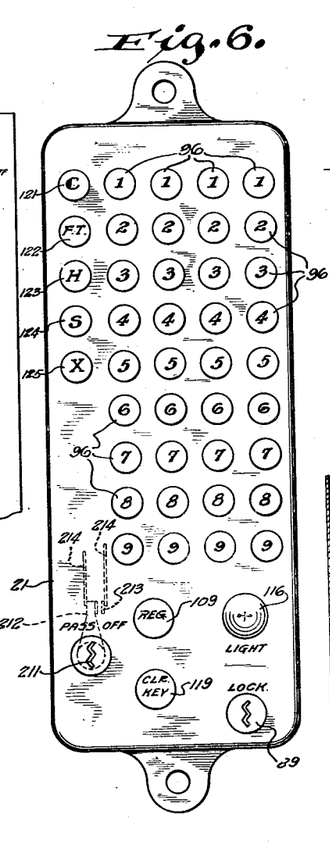
Fig. 6 is a front view of a key board for controlling and operating the recorder.

All of the circuit wires connecting with the switches within the key-board are grouped and are let out through an opening 122. Said wires, of course, enter the recorder casing 20 and connect with proper magnetic clutches. The wiring arrangement and diagram is illustrated clearly in Fig. 5. It should also be noted that the key-board is provided with four vertical rows of keys 96, each row ranging from "1" to "9", and the keys of each row controlling a corresponding number roll in the recorder. There is also a fifth vertical row of keys 121, 122, 123, 124, and 125, on the key-board controlling a corresponding symbol roll on the recorder bearing the letters "C", "F.T.", "H", "S" and "X" respectively, which represent respectively, (C) cash-fare,—(F.T.) free transportations issued by the railroad, (H) half-fare, (S—) refers to a passenger who has purchased a sleeping-car berth in addition to the regular coach-fare previously paid, and in checking the record, one passenger should be deducted where a "—" (minus) appears in the symbols. (X) represents a through passage ticket beyond the first conductor's territory. This fare is recorded but the ticket is not taken up by the first conductor. Said keys 121, 122, 123, 124 and 125 operate similarly to the other keys and control a suitable indicator roll and a type roll in the recorder. When a fare is collected to which any of the above items apply, the amount of the fare should be preceded by the proper letter designation.

In the recording of a fare when the keys are depressed as described, certain electrical circuits are closed. Within the recorder are a plurality of magnetic clutches 126 (see Fig. 1) and in those which are influenced by the circuits which were closed, complementary clutch parts 127 will be attracted to the main clutch bodies. With the clutches 126 thus engaged any of the shafts 141, 142, 143, 144, 145, 146, 147, 148 or 149 on which the engaged clutches are mounted become driving shafts. With the depression of the register key the circuit to a magnetic clutch 129 is closed. Said clutch is interposed on a shaft 130 which is driven by an electric motor 131 within the register casing. On the clutched portion of said shaft 130 is mounted loosely a cam 132 which is turned on said shaft when the clutch is engaged. Pivotally mounted to the bottom of the casing, as at 133, is an arm 134 extended adjacent the cam 132 and carrying a roller 135 engaged by the cam. The cam in turning, will move the arm 134 to the right in Fig. 2, also pulling therewith a link 136 pivotally connected at one end portion to said arm. Said link 136 is pivotally connected at its inner end portion to one end portion of an arm 137 (see Fig. 3) and as said arm is mounted fast on a shaft 138 on which a segment 139 is also mounted fast, said segment will be turned in a counter clock-wise direction in Fig. 3, causing a plurality of equally sized gears 140, mounted on shafts 141, 142, 143, 144, 145, 146, 147, 148 and 149 extended through a curved frame 150, to rotate one-half of a revolution in a clock-wise direction in Fig. 3. It will be recalled that on each of the shafts 141 to 149 inclusive is a magnetic clutch 126, and each of said shafts loosely carries respectively sets of five gears, the gears of each set being designated 151, 152, 153, 154, 155, 156, 157, 158 and 159, the various sets of gears being graduated in size. The gears on the shafts which are influenced by the closed magnetic clutches 126 will rotate to the right in Fig. 2, causing any or all of five segmentally toothed wheels 160, with which they are in mesh, to turn in a counter clock-wise direction. The angularity of movement of the wheels 160 which are thus moved depends on which of the gears 151 to 159 inclusive are driving the same. Each of four of said toothed wheels 160 has mounted in its rim type numbers 161 ranging from "0" to "9," the "0" position of each wheel being its normal position and the type number which is brought into printing position depends on the amount of rotation of the particular wheel 160, which is derived from the driving gears. The fifth wheel contains the letters "C," "F.T.," "H," "S," and "X." The larger driving gears, as 151, will give a relatively large movement to the wheels 160 and bring into position the type numbers "9," while the smaller driving gears, as 159, will give a relatively small movement to the wheels and bring into printing position the type numbers "1". As previously explained, the gears which become driving wheels for this purpose are controlled by the keys of the key-board and the closure of selected magnetic clutches.

Figure 3:
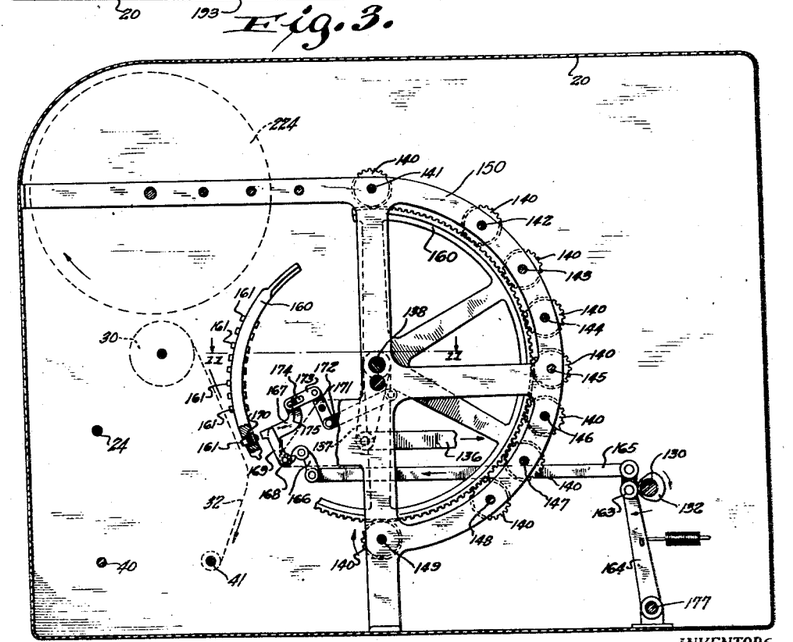
Fig. 3 is a sectional view taken on line 3—3 of Fig. 1 and on a smaller scale, with the motor and other parts omitted.

After the selected wheels 160 are in selected printing positions a cam 162, which is integral with the magnetic clutch 129 operates against a roller 163 on an arm 164, causing it to move to the left in Fig. 3, thereby pushing a trip link 165 which is pivotally connected thereto and causing a trigger 166 pivotally connected to the inner end portion of the trip link, to release an arm 167, which is held under tension. The arm 167 is attached to a shaft 168 on which shaft there are also a plurality of type hammers 169, and said arm and type hammers spring forward to strike the type numbers 161 which are in printing positions on the various wheels, and impressions are made on the paper 27 through the ribbon 32. There is shown in Fig. 3, a detail of a type number mounting, and after the type is struck, a coiled spring 170 will return it to normal position.

After impressions have been made by the type, arm 134 which had previously moved, then returns to the left to normal position. The segment link 136 and the segment 160 are returned thereby to normal position so that the parts are ready for the next fare to be recorded. During the return movement of said segment, a link 171 which is connected thereto, pushes a pivotal liver 172 which in turn moves a link 173 to the right in Fig. 3. Said link 173, being slotted as at 174 to permit the forward motion of the arm 167 previously referred to, by engagement with a pin 175, returns the arm 167 and causes the trigger 166 to be re-set in holding position also in readiness for the recording of the next fare.

Figure 4:
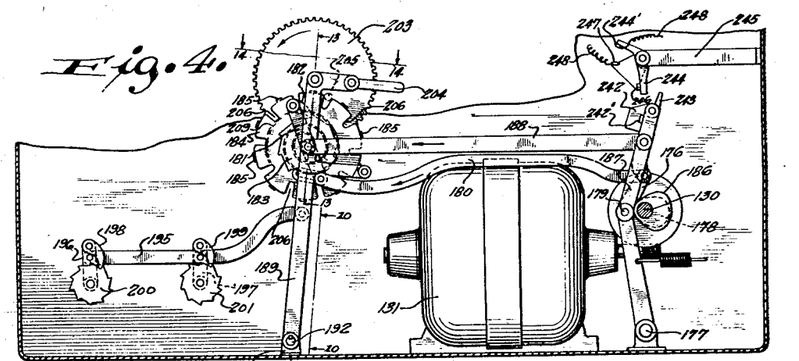
Fig. 4 is a sectional view taken on line 4—4 of Fig. 1.
Figure 10:
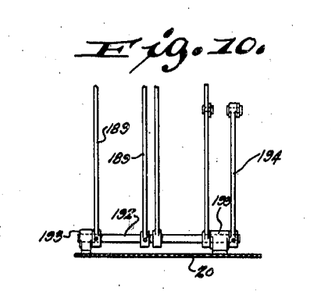
Fig. 10 is a detail view taken on line 10—10 of Fig. 4.
Figure 13:
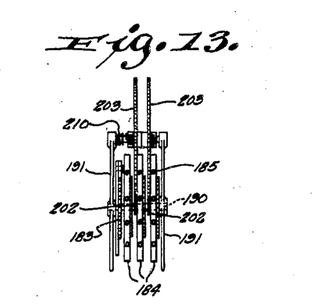
Fig. 13 is detail view taken on line 13—13 of Fig. 4.

While the before-mentioned operations are being performed an arm 176, which is pivotally mounted at its lower end portion, as at 177 (see Fig. 4), is pushed to the left in Fig. 4 by the engagement of a cam 178 with a cam roller 179 on said arm. The cam 178 is mounted fast on the shaft 130 which is driven from the motor 131 and operates when the magnetic clutch 129 is engaged. The movement of the arm 176 causes a link 180 connected thereto to be pushed and said link, in turn, operates a lever 181, moving a pawl 182 to the right in Fig. 4, thereby causing a ratchet 183, which is secured to a type wheel 184, to move through one-tenth of a revolution, bringing the first type numeral 185 of said type wheel into printing position. The cam 178 is formed with a dwell, so the arm 181 is permitted to remain in its moved position for a short period. There is also mounted on the shaft 130 another cam 186 which is designed so that during this pause it will push an arm 187 forwardly and cause a link 188 to move to the left in Fig. 4 and thereby push arms 189 forwardly. By particular reference to Figs. 10 and 13 it will appear that there are three number wheels 184 mounted loosely on a shaft 190 which is journaled in a pair of laterally extending arms 191 and said arms are attached to the pair of spaced vertical arms 189 which are pinned at their lower end portions to a rod 192 mounted in bearing brackets 193 secured to the lower portion of the casing 20. Hence, when the arms 189 are pushed forwardly, as mentioned, the type wheels 184 contact with the ribbon 32 and record successively on the paper 27 the passengers on the coach. During the movement of the arms 189, an arm 194, which is also pinned to the rod 192, pushes to the left in Fig. 4 a link 195 thereby causing a pair of arms 196 and 197 which are pivotally carried thereby and have pivotally attached pawls 198 and 199, to move said pawls to the left over ratchets 200 and 201. On the return stroke of the link 195, said pawls engage the ratchets 200 and 201, moving the same to the right, thereby feeding the paper and ribbon into position for the next impression.

Figure 11:
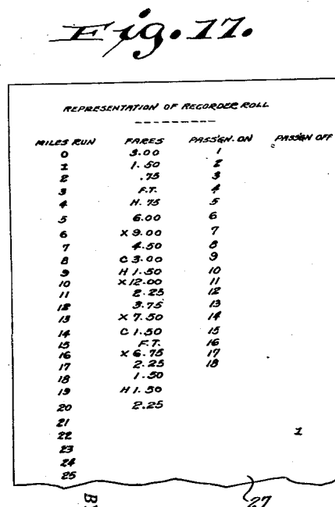
Fig. 11 is a detail sectional view taken on line 11—11 of Fig. 3.
Figures 11, 12, 14:
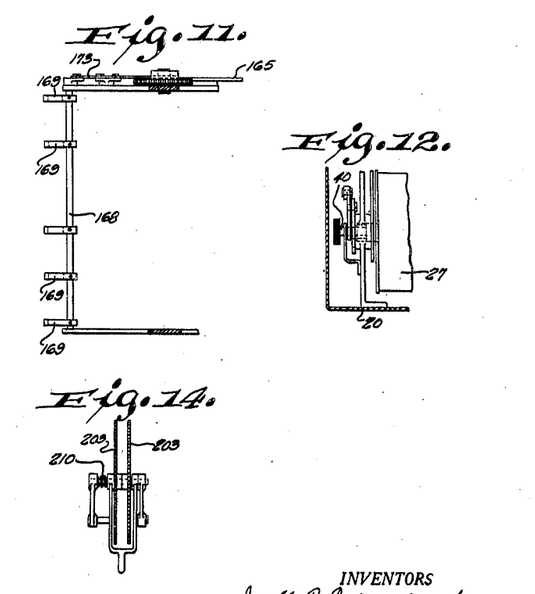
Fig. 12 is a detail view taken on line 12—12 of Fig. 1.
Fig. 14 is a detail view taken on line 14—14 of Fig. 4.

The three type wheels 184 are connected by means of gears 202 and 203 having a ratio of one to ten, so that said gears will be advanced in proper sequence to total the passengers on the vehicle, this arrangement being similar to that described in connection with the totaling of the type wheels for the mileage record. The wheels may be set back to zero by moving a shifting lever 204. This disengages the respective gears 202 and 203 and also releases pins 205 carried by the gears 203 from engagement with notches 206 in said type wheels. Then, upon the depression of a lever 207, pawls 208 are disengaged from the type wheel ratchets 183. Springs 209 within said type wheels return them to normal "0" position. When the shifting lever 204 is released springs 210 (see Figs. 13 and 14) put the gears 202 and 203 into mesh again.

The apparatus is also provided with "passenger off" mechanism arranged so that a member of the coach crew may register persons as they get off the coach. For this purpose a key is inserted in a lock 211 in the key-board 21 turning a lug 212 to close a switch 213 and a circuit will be then completed through circuit wires 214 to a magnetic clutch 215 within the register casing, engaging said clutch, whereby cams 216 and 217 are turned. An elongated link 218, connected with the cam 216 operates type wheels 219 which are geared so as to total in a manner similar to the type wheels 184. Said type wheels are mounted in a similar manner and their action is precisely similar to the action of said wheels 184 previously explained. Also the paper and ribbon are advanced by ratchets 220 turned by pawls carried by a link 222 which is connected with a link 223 moved by said cam 217.

Within the upper portion of the register casing, a plurality of number rolls 224 and a letter roll 225 are mounted on a shaft 226. At the time that the printed record of a collected fare is being made on the paper roll, any of the gears 151, which are always in motion when their respective segments 160 are moved, drive their corresponding rolls 224 or 225 through a series of gears 227, 228, 229 and 230 and a ratchet 231, the ratchets being carried by driving disc 232 on the wheels. Each driving disc is formed with a pin 233 adapted to contact with a stop 234 on the adjacent roll 224. This causes one or more of the rolls 224, according to which are operated through the gears, segments, etc., to turn a certain distance to bring a designation 235 into registration with one of a series of windows 236 in the front portion of the casing. In this manner the fare recorded by the conductor will be shown to the passengers in the coach. Each roll 224 is held in its turned position by a pawl 237 engaging its ratchet 231. On the return stroke of the segments 160 which are operating, the moved driving discs 232 will be returned to normal position. When the next fare is recorded, the circuit to a magnet 238 is closed and an arm 239, fast on a shaft 240 on which the pawls 237 are mounted, is attracted, and the engaging pawls 237 thereby release their respective ratchets and the rolls 224 and 225, which were moved, return to normal positions by means of spiral springs 241.

As previously mentioned, the incandescent bulb 116 glows momentarily after a fare has been recorded, or after a passenger has been registered "off". This indicates to the operator that the registration is complete. For this purpose triggers 242 (see Fig. 4) are pivotally connected to the arm 187 and when said arm moves forward a lug 243 is tripped by contact with a switch arm 244, the switch 244 being pivotally mounted on a bracket 245. Pivotal movement of said switch arm is limited in one direction by a stop 246. When said lug 243 is tripped, the arm 187 may pass the switch 244. The trigger 242 is weighted, as at 242' so that it will return to normal position. On the return stroke the lug 243 again strikes the switch 244 and moves it against the tension of a spring so that its contact portion 244' will engage a contact element 247 to close the switch, which through circuit wires 248 will cause the bulb 116 on the keyboard to light. The light will then go out as soon as the switch 244 springs to its normal position shown, breaking the circuit. As soon as the light is extinguished, the keyboard operator will know that the registration has been completed and will release the register key.

The magnetic clutch 129 is provided with collector rings 249 and 250 which gather current through wiper connections. Said clutch is also provided with an internal spring 251 which will cause the clutch parts to become disengaged when the circuit thereto is broken.

Figure 1:
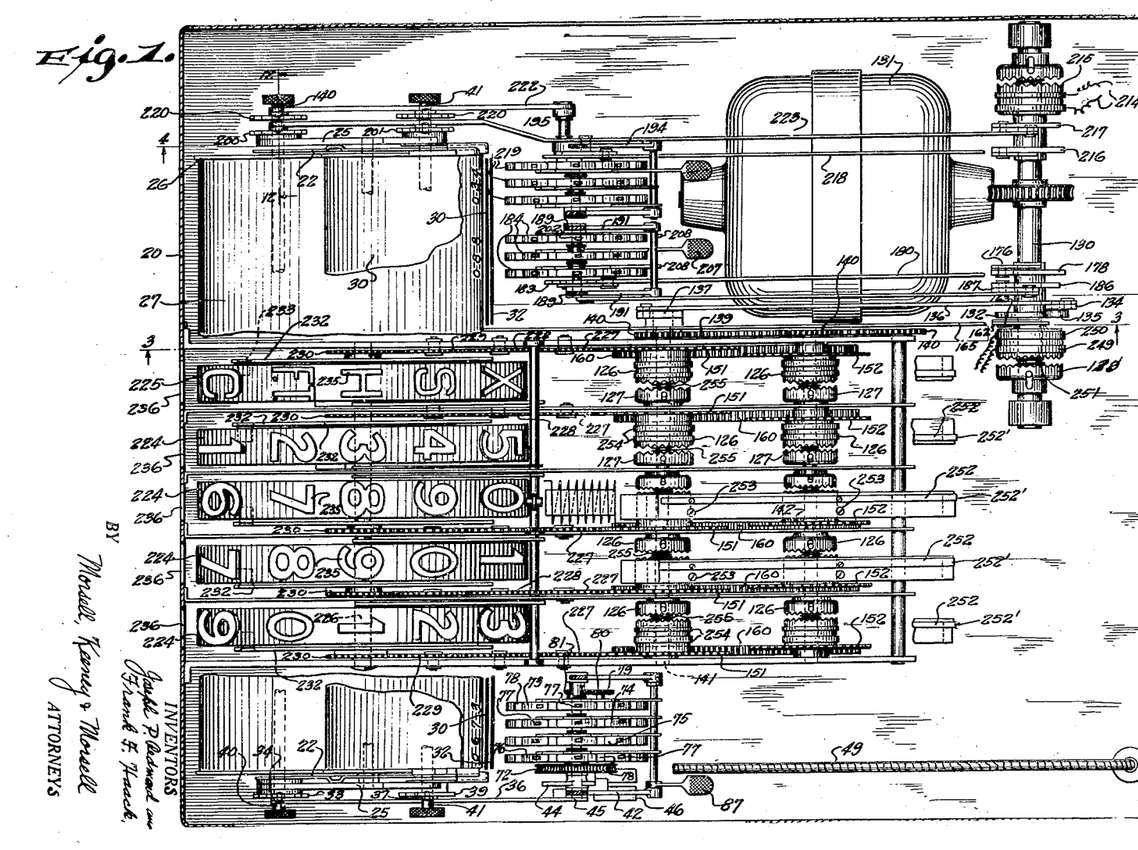
Fig. 1 is a plan view of the coach fare recorder with the enclosing casing shown in section; and parts broken away to show parts therebeneath.
Figure 2:
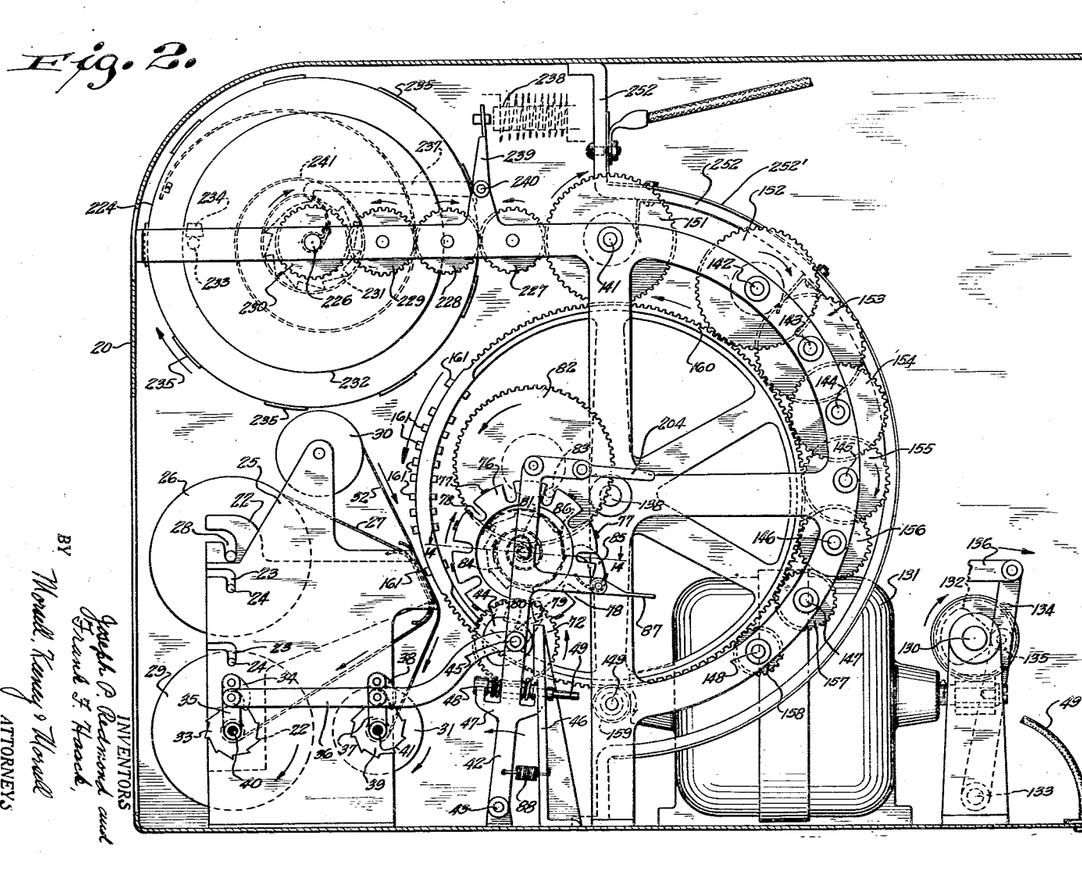
Fig. 2 is a side view thereof with the casing shown in section.

Wires for the various circuits for registering the fares are attached to members 252 shown in Figs. 1 and 2. Said members 252 are formed of insulating material and the wires are attached to the surfaces 252'. Individual wires are attached to screw terminals 253. Wiper connections are made between the portions 252' and the terminals 253 to collector rings 254 on the clutches 126. Said clutches are provided with internal springs 255 to cause a separation of the clutch parts when the circuits are broken.

From the foregoing description it will be seen that the improved coach fare recorder is of simple and novel construction; and is well adapted for the purpose described.

What is claimed as the invention is:

1. In a coach fare recorder, a plurality of adjacent fare printing wheels independently revolubly mounted, driving mechanism for each wheel, a magnetic clutch controlling the operation of each driving mechanism, a key board, and a plurality of electrical circuits between the key board and the magnetic clutches.

2. A coach fare recorder, comprising a revolubly mounted type wheel, a plurality of operating members engaging said type wheel for revolving it, the amount of movement imparted to the type wheel by each of said members being different, and selective means for setting into operation a predetermined operating member to bring into printing position a desired portion of said type wheel.

3. A coach fare recorder, comprising a revolubly mounted type wheel, movable type members mounted in a portion thereof, type actuating means positioned adjacent said type wheel, a plurality of operating members engaging said type wheel for revolving it, the amount of movement imparted to the type wheel by each of said operating members being different, selective means for setting into operation a predetermined operating member to bring a certain type member into position adjacent said type actuating means, and means for operating said type actuating means to cause a printing movement of said type member.

4. A coach fare recorder, comprising a revolubly mounted type wheel, a plurality of gears, varying in size, engaging said type wheel to turn the same, electro-magnetically controlled means for setting into operation only one of said gears to turn the type wheel through a desired angle, and selective control means.

5. A coach fare recorder, comprising a plurality of adjacent revolubly mounted type wheels, a set of operating members for each type wheel, the amount of movement imparted to a type wheel by each of said operating members of a set being different, and selective means for setting into operation certain operating members of each set to simultaneously bring various portions of all of said type wheels into printing positions.

6. In a recording device, a frame, a plurality of spaced two-part shafts journaled therein, a magnetic clutch for joining the portions of each shaft, a gear on each shaft, a segmental gear in mesh with all of said gears, means for simultaneously turning said segmental gear and engaging the clutch on a predetermined shaft, a driving gear mounted on each of said shafts, all of said driving gears differing in size, and a rotatably mounted toothed type wheel in mesh with all of said driving gears and revoluble through a predetermined arc by the movement of the driving gear on the shaft in which the clutch was engaged.

In testimony whereof, we affix our signatures.

JOSEPH P. REDMOND.
FRANK F. HAACK.